United States Patent
Sella et al.

(10) Patent No.: US 10,581,942 B2
(45) Date of Patent: *Mar. 3, 2020

(54) ALLOCATING CAPACITY OF A NETWORK CONNECTION TO DATA STREAMS BASED ON TYPE

(71) Applicant: Level 3 Communications, LLC, Broomfield, CO (US)

(72) Inventors: William Thomas Sella, Parker, CO (US); James Michael Sella, Parker, CO (US); Pete Joseph Caputo, II, Highlands Ranch, CO (US)

(73) Assignee: Level 3 Communications, LLC, Broomfield ( * ) Notice: Subject to any disclaimer, the term of this patent is extended or adjusted under 35 U.S.C. 154(b) by 0 days.

This patent is subject to a terminal disclaimer.

(21) Appl. No.: 16/398,018

(22) Filed: Apr. 29, 2019

(65) Prior Publication Data

US 2019/0260812 A1 Aug. 22, 2019

Related U.S. Application Data

(63) Continuation of application No. 15/912,437, filed on Mar. 5, 2018, now Pat. No. 10,277,647, which is a (Continued)

(51) Int. Cl.
*H04L 29/06* (2006.01)
*H04L 12/851* (2013.01)
(Continued)

(52) U.S. Cl.
CPC .......... *H04L 65/4069* (2013.01); *H04L 45/22* (2013.01); *H04L 45/24* (2013.01);
(Continued)

(58) Field of Classification Search
None
See application file for complete search history.

(56) References Cited

U.S. PATENT DOCUMENTS 6,124,878 A * 9/2000 Adams .................. H04N 7/10
348/E7.049
6,160,813 A 12/2000 Banks et al.
(Continued)

FOREIGN PATENT DOCUMENTS

| JP | 2001024706 | 1/2001 |
|---|---|---|
| JP | 2006050371 | 2/2006 |
| JP | 2010166569 | 7/2010 |

OTHER PUBLICATIONS

Japan Notice of Reasons for Rejection, dated May 7, 2019, Application No. 2017-517014, filed Sep. 22, 2015; 11 pgs.
(Continued)

*Primary Examiner* — Saba Tsegaye

(57) ABSTRACT

A user of a communication network may have specific requirements for its critical data streams. The user may require dedicated channel capacity for its critical application. A dedicated channel may be separate from a common channel carrying non-critical data of the user. The user may create policies for assigning channel capacities to its critical data streams based on various criteria. The user may also create policies on sharing the dedicated channel capacity among its different critical data streams.

20 Claims, 10 Drawing Sheets

Related U.S. Application Data continuation of application No. 14/678,671, filed on Apr. 3, 2015, now Pat. No. 9,912,709.

(60) Provisional application No. 62/057,763, filed on Sep. 30, 2014.

(51) Int. Cl.
*H04L 12/707* (2013.01)
*H04L 12/863* (2013.01)
*H04L 12/875* (2013.01)

(52) U.S. Cl.
CPC .......... *H04L 47/2441* (2013.01); *H04L 47/54* (2013.01); *H04L 47/56* (2013.01); *H04L 65/605* (2013.01)

(56) References Cited

U.S. PATENT DOCUMENTS

| | | | |
|---|---|---|---|
| 6,678,248 | B1 | 1/2004 | Haddock |
| 6,687,247 | B1 | 2/2004 | Wilford |
| 7,352,746 | B1 | 4/2008 | Sekihata |
| 7,969,878 | B2 | 6/2011 | Fawaz |
| 8,589,524 | B1 | 11/2013 | Sella et al. |
| 8,611,355 | B1 | 12/2013 | Sella et al. |
| 2002/0114332 | A1 | 8/2002 | Apostolopoulos et al. |
| 2003/0063609 | A1 | 4/2003 | Bergenfeld |
| 2004/0218035 | A1 | 11/2004 | Crook |
| 2005/0021621 | A1 | 1/2005 | Welch |
| 2005/0078653 | A1 | 4/2005 | Agashe |
| 2005/0174965 | A1 | 8/2005 | Sarkkinen |
| 2007/0253332 | A1 | 11/2007 | Fawaz et al. |
| 2010/0202449 | A1 | 8/2010 | Moscibroda et al. |
| 2011/0051642 | A1* | 3/2011 | Krishnaswamy ..... H04W 40/10 370/311 |
| 2013/0332622 | A1 | 12/2013 | Wang |
| 2016/0094416 | A1 | 3/2016 | Sella et al. |
| 2018/0198832 | A1 | 7/2018 | Sella et al. |

OTHER PUBLICATIONS

Sato, Hiroaki et al., "Study of VC/VP Interface Supporting Plurality of QoS", Technology Study Report of Institute of Electronics and Communication Engineers of Japan, vol. 94, No. 66 May 26 1994, pp. 49-54.

Extended European Search Report, dated Apr. 17, 2018, Application No. 15846091.5, filed Sep. 22, 2015; 7 pgs.

International Preliminary Report on Patentability, dated Apr. 4, 2017, Int'l Appl. No. PCT/US15/051528, Int'l Filing Date Sep. 22, 2015; 11 pgs.

International Search Report dated Dec. 28, 2015, Int'l Appl. No. PCT/US15/051528, Int'l Filing Date Sep. 22, 2015; 3 pgs.

Written Opinion of the International Searching Authority dated Dec. 28, 2015, Int'l Appl. No. PCT/US15/051528, Int'l Filing Date Sep. 22, 2015; 9 pgs.

\* cited by examiner

ALLOCATING CAPACITY OF A NETWORK CONNECTION TO DATA STREAMS BASED ON TYPE

This application is a Continuation of U.S. patent application Ser. No. 15/912,437, filed Mar. 5, 2018, now U.S. Pat. No. 10,277,647, which is a Continuation of U.S. patent application Ser. No. 14/678,671, filed Apr. 3, 2015, now U.S. Pat. No. 9,912,709, which claims priority from U.S. Provisional Patent Application No. 62/057,763, filed Sep. 30, 2014. To the extent appropriate, the present application claims priority to the above-referenced applications.

BACKGROUND

Field

This field is generally related to communication networks.

Related Art

A communication network may, for example, provide a network connection that allows data to be transferred between two geographically remote locations. A network connection may allow different types of data streams to reach their respective destinations.

The network connection may have a particular bandwidth reserved for a particular user. In other words, no other user of the network can have access to the bandwidth reserved for a particular user on a dedicated connection. Reserving may involve associating a particular bandwidth with a user. While still reserving bandwidth, a network may be oversubscribed, meaning that if all users were using all their associated bandwidth, the network would have insufficient capacity. The bandwidth assigned to a connection may be shared among different types of applications and data streams using the connection.

Different types of data streams may have different capacity needs. A user may generate different data streams and have different requirements for transmission of each type of data stream. For example, a data stream may have certain capacity or latency requirements. A user's requirements for the data stream may also vary depending on the time. To deal with changing requirements over time, some communication networks allow a user to change a connection's capacity during a specified time period in the future.

While adjusting connection capacity may accommodate some flexibility, having a shared channel may result in unnecessary competition among different traffic streams.

BRIEF SUMMARY

In an embodiment a computer-implemented method transmits data from a source to a destination through a plurality of interconnected forwarding devices. The method includes receiving at a forwarding device, on a common channel from the source to the forwarding device, a first packet in a first data stream. The common channel may have a common capacity. In response to receiving the first packet, the first packet is forwarded on the common channel from the forwarding device to the destination. Also it is determined whether the first data stream is a critical data stream, based on information about the first packet in the first data stream. When the first stream is determined not to be critical in, the forwarding device is configured to forward a second packet of the first data stream on the common channel from the forwarding device to the destination. When the first data stream is determined to be critical, the forwarding device is configured to forward a second packet of the first data stream on a first channel from the forwarding device to the destination. The first channel has a first capacity and the first channel is different from the common channel.

System and computer program product embodiments are also disclosed.

Further embodiments, features, and advantages of the invention, as well as the structure and operation of the various embodiments, are described in detail below with reference to accompanying drawings.

BRIEF DESCRIPTION OF THE DRAWINGS

The accompanying drawings, Which are incorporated herein and form part of the specification, illustrate the present disclosure and, together with the description, further serve to explain the principles of the disclosure and to enable a person skilled in the relevant art to make and use the disclosure.

The drawing in which an element first appears is typically indicated by the leftmost digit or digits in the corresponding reference number. In the drawings, like reference numbers may indicate identical or functionally similar elements.

DETAILED DESCRIPTION

As mentioned above, having a channel that is shared among different data steams presents a risk that critical data may be bottlenecked by non-critical data. To deal with this, embodiments disclosed here transmit user's critical data streams on a dedicated channel. In one example, a network user, such as a web content provider, may send web content to its customers across the network. The web content may be sent in different data streams. Some of the data streams may be critical, and the content provider may require dedicated channels with specific capacities be assigned to this critical data.

The network user may be able to establish policies that define what data is and is not critical. Depending on the user policy, different types of user traffic may be assigned to different channels in the network with specific capacities. Policies may specify what data is critical using different criteria. For example, the user may have a policy that any stream of data going to a given address, for example "salesforce.com," is assigned a dedicated channel. While the description herein uses the terms "critical" and "non-critical" to describe the different data streams sent on the different channels, a skilled artisan would recognize that these apply to any data streams having different types.

In one embodiment, a user policy may allocate a single channel, sometimes referred to herein as a bundle channel, to handle all critical traffic, while keeping another, common channel for the non-critical traffic. In this embodiment, the critical data streams may compete with each other over the capacity in their single dedicated channel. In another embodiment, the critical data may each be individually assigned a portion of the bundle channel. For example, if the bundle channel has 50 Mbps bandwidth, each of its critical data streams may be allocated 5 Mbps capacity. In this way, by allocating dedicated capacity to the critical data streams, embodiments provide a user with a minimum capacity available to its critical applications, regardless of its other non-critical applications that use a common channel separate from the dedicated channels.

The Detailed Description that follows is divided into five sections. The first section describes, with respect to FIGS. 1A-B and 2, a network for establishing connections for a user over a network. The second section describes, with respect to FIG. 3, allocating channels to user traffic. The third section describes, with respect to FIGS. 4-5, allocating channel to critical and common data streams of the user. The fourth section describes, with respect to FIGS. 6-8, allocating capacity among the critical data streams of a user. The fifth section describes, with respect to FIG. 9, terminating dedicated channels assigned to a user.

Network for Establishing User Connections

Figure 1A:
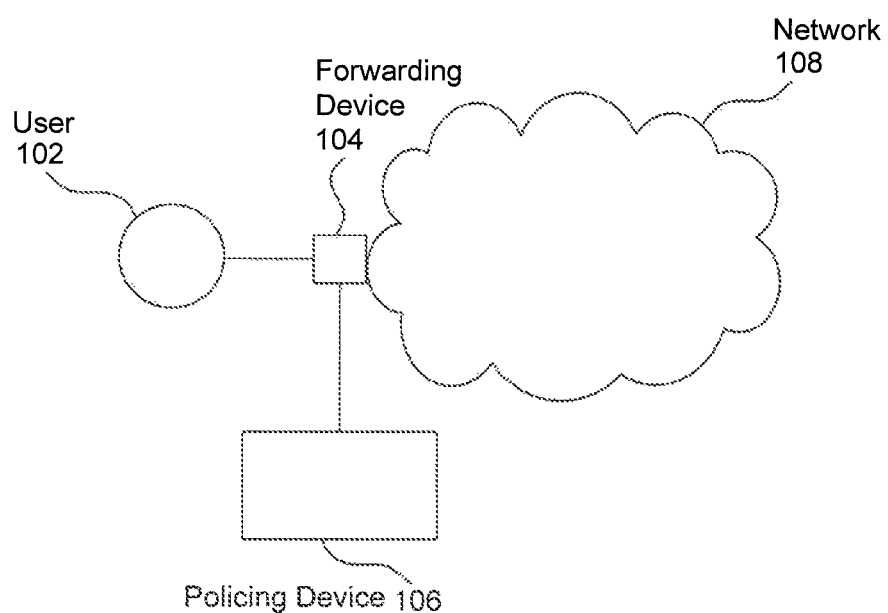
FIG. 1A is a diagram that illustrates a system for providing a network connection for a user.

FIG. 1A illustrates a system 100 that includes a communication network 108. The communication network 108 may be a local area network (LAN), metropolitan area network (MAN), or wide area network (WAN). It may utilize any point-to-point or multipoint-to-multipoint networking protocols. The network access protocols used may include, for example, Multi Label Protocol Switching (MPLS), Ethernet, Asynchronous Transfer Mode (ATM), High-Level Data Link Control (HDLC), or Frame Relay.

Communication network 108 includes a plurality of routers, such as forwarding device 104, connected to a network user 102. Here, the term "forwarding device" refers to devices that switch or route packets, including devices at the data link layer (OSI layer 2) and the network layer (OSI layer 3). Forwarding device 104 may be connected to user 102 via a direct link, or indirectly over a local network. User 102 may be an individual or an enterprise network such as an organization's internal network. User 102 generates data traffic for different destinations on communication network 108 in embodiments user 102 may be a web service provider, providing content to clients connected to network 108.

Forwarding device 104 connects user 102 to network 108. Forwarding device 102 is connected to a policing device 106. In embodiments, policing device 106 keeps information about user policy on how to assign channels to critical traffic. Using a policy created by the user, policing device 106 sends configuring signals to forwarding device 104. Based on the configuring signals, forwarding device 104 regulates channel assignment to user 102 data streams. In other words, based on decision by policing module 106, forwarding module 104 assigns a dedicated channel to a user's critical data stream or assigns common channel to a non-critical data stream of the user.

The policies governing data streams generated by user 102 and destined for user 102 may be the same or different. In example embodiments, user 102 may create a policy that only data streams generated by user 102 may be critical. In other example embodiments, specific data streams to or from user 102 may be critical, but the with different channel capacity assignments in either direction.

For example, user 102 may create a policy such that all the data streams generated by a subset of terminals of user 1 are critical. User 102 may further specify in its policy that each critical data stream generated by each terminal should be assigned a dedicated channel capacity. Channel capacity for all the critical streams may be the same or different. In another example, user 102 may create a policy in which a subset of its data streams are critical and the rest of its data streams are not critical. Tire user may specify in its policy that the non-critical traffic will share a common channel capacity.

Figure 1B:
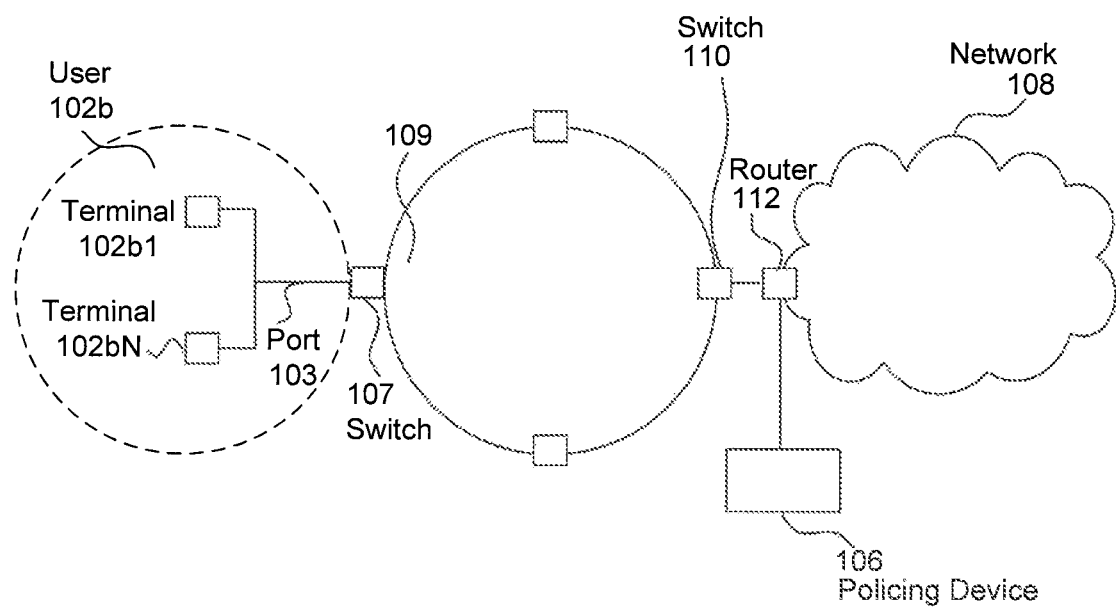
FIG. 1B is a diagram that illustrates a system for providing a network connection for a user.

FIG. 1B illustrates a system 100b that provides connections over network 108 to a user 102b. According to an embodiment, user 102b may generate data traffic from different terminals such as terminals 102b1, . . . , 102bN, connecting to a port 103 of a switch 107. Switch 107 may be connected to a local area network (LAN) 109 that uses technologies such as Ethernet or Token ring. Local area network 109 via switch 110 is connected to network 108 via router 112. In example embodiment shown in this figure, router 112 may regulate channel capacities assigned to different data streams generated by user 142b. In this embodiment policing device 106 is connected to router 112.

In other embodiments, switch 107 or switch 110 may regulate channel capacities assigned to different data streams generated by user 102b. In such embodiments, policing device 106 may be connected to the respective regulating switch.

Policing device 106 may determine whether a dedicated channel should be assigned to each stream of traffic from user 202. Policing device 106 makes such determination based on a user-created policy. In an embodiment, policing device 106 sends a signal to router 112 to configure the router such that channel capacities are assigned to critical traffic streams of user 102b according to the user's policy.

Figure 2:
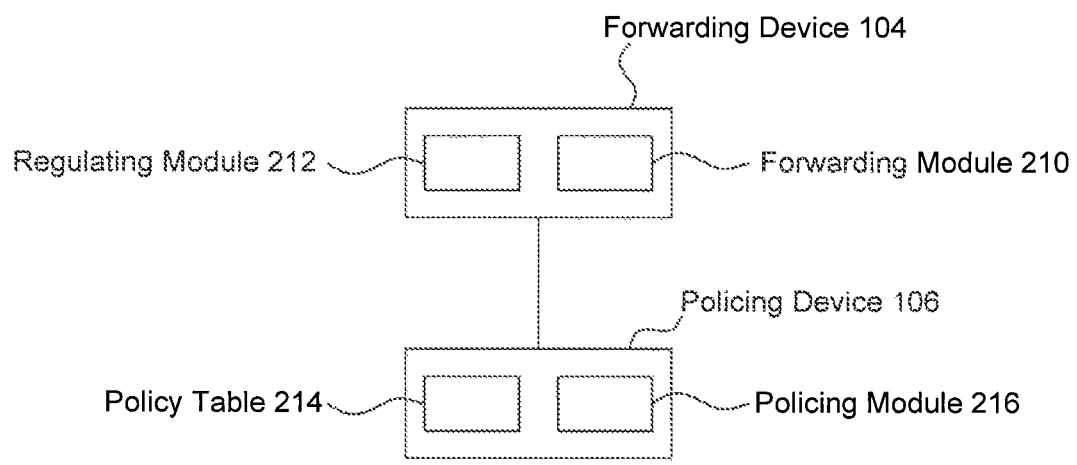
FIG. 2 is a diagram that illustrates modules of a forwarding device and a policing device.

FIG. 2 is a diagram that illustrates system 200 that shows forwarding device 104 and policing device 106 in greater detail. Forwarding device 104 may include a forwarding module 210 and a regulating module 212. Forwarding module 210 receives packets in a data stream on an input to the forwarding device. Forwarding module 210 further transmits the packets to an output of the according to a destination address of the packets.

Regulating module 112 regulates the capacity of a channel assigned to a data stream. For example, regulator 114 provisions the capacity for transmitting a critical stream, according to a capacity for such stream specified in the policy created by user 102.

In embodiments, policing device 106 includes a policy table 214 and a policing module 216. Policy table 214 holds the policy information user 102 has created for its data streams. For example, policy table 114 has information indicating which types of data stream user 102 considers as critical. For example user 102 may consider all data streams destined to a specific destination as critical. In another example where user 102 includes multiple terminals, user 102 may consider all traffic generated by certain terminals as critical. Other examples of critical data streams include traffics generated during certain time periods that have certain destination addresses. User 102 defines in its policy what amount of capacity to be dedicated to each critical stream.

Figure 3:
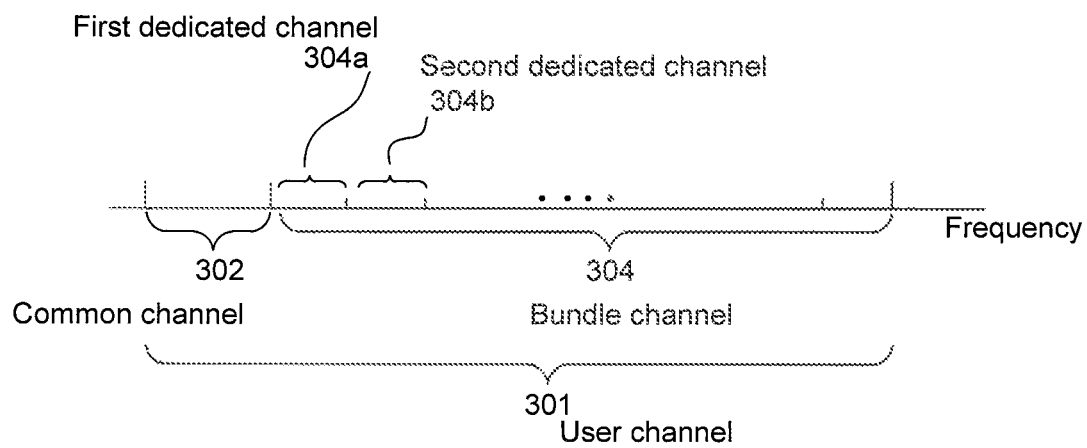
FIG. 3 is a diagram that illustrates different channels that may be assigned to a user data streams.

In an embodiment, the entire bandwidth available to user 102 may be divided as shown in FIG. 3.

User Channel Allocation

FIG. 3 is a diagram illustrating an example channel capacity assignment 300 to data streams of a user. To assign portions of the bandwidth to particular channels, various techniques are available including frequency division multiplexing, code division multiplexing, time division multiplexing, or any other multiplexing schemes. For illustration, frequency division multiplexing is shown in FIG. 3.

In FIG. 3, bandwidth 301 is available to all the data streams of user 102. Common channel 302 is available to all non-critical traffic of the user. In other words, all the non-critical traffic of user 102 share channel 302. Bundle channel 304 is assigned to all the critical traffic streams of user 102. In one embodiment, all the critical traffic streams share bundle channel 304. Capacity sharing and channel access algorithms, such as Multiple Access with Collision Avoidance (MACA), Carrier sense multiple access (CSMA), or Distributed Coordination Function (DCF) may be used for carrying data on the common channel In another embodiment, instead of having critical data streams share the entire bundle channel 304, dedicated channels within bundle channel 304 may be assigned for each of the data streams. In particular, first and second dedicated channels 304a and 304b, which are part of the bundle channel 304, are assigned to respective first and second critical data streams of user 102.

In an example, 100 Mbps bandwidth may be available to all the data streams of user 102. A channel with 10 Mbps bandwidth may be available to all non-critical traffic of the user, and a bundle channel of 90 Mbps may be available to all the critical traffic streams of the user. The user may have 9 dedicated channels for 9 critical data streams where each channel has a 10 Mbps bandwidth. Alternatively, the user may have a first dedicated channel with 40 Mbps bandwidth assigned to a first critical data stream, and a second dedicated channel with 60 Mbps bandwidth assigned to a second critical data stream.

Channel Allocation to Critical and Common Data Streams

Figure 4:
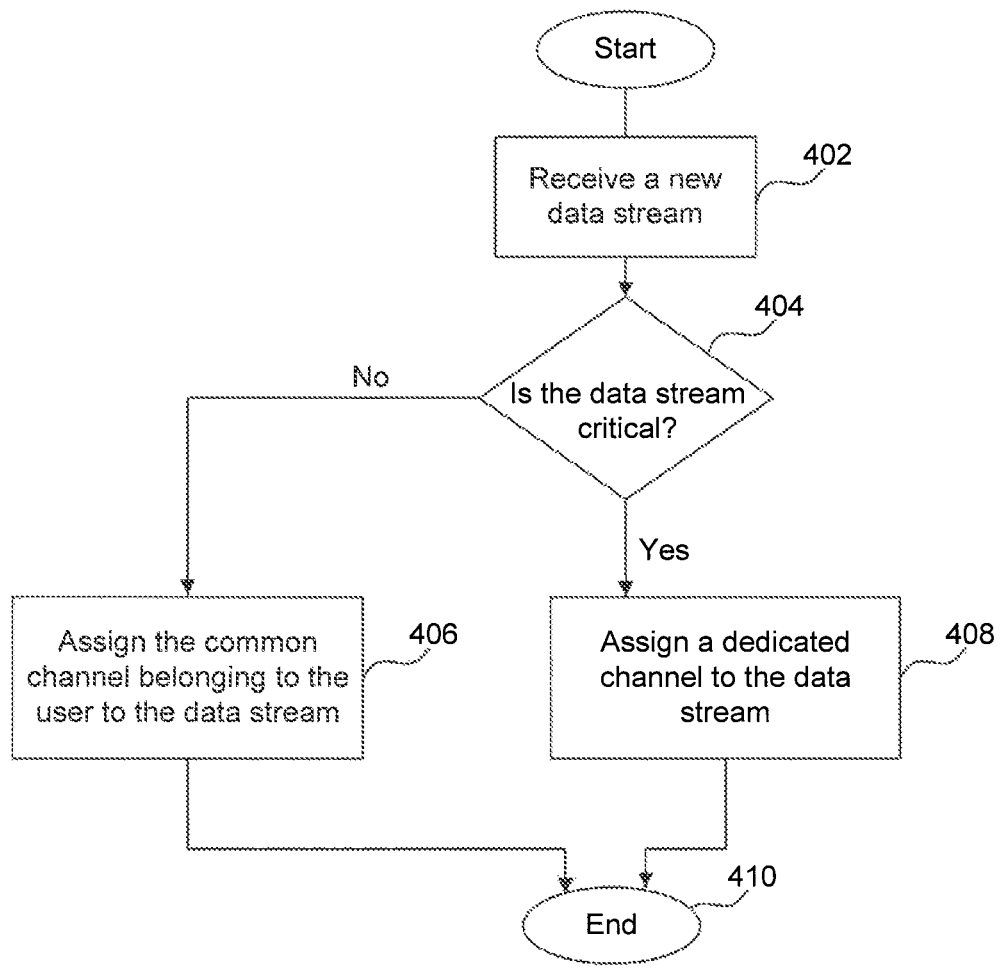
FIG. 4 is a flowchart that illustrates a method for assigning a channel to a user data stream.

FIG. 4 is a flowchart that illustrates a method 400 for determining a channel for a data stream. Method 400 is described with respect to the example embodiments in FIGS. 1A-B, 2, and 3.

Referring to FIG. 4, method 400 begins at step 402 by receiving a new data stream. In an embodiment, the new data stream may be generated by user 102. In another embodiment, the new data may be incoming and destined to user 102. In embodiments, a forwarding device's forwarding module 210 illustrated in FIG. 2 receives the new data stream.

Each data stream may be one or more packets in time proximity with one another having a common (1) protocol, (2) source/destination Internet Protocol (IP) addresses, and (3) source/destination Transport Control Protocol (TCP) or User Datagram Protocol (UDP) ports. When a certain amount of time passes after receipt of a packet having these characteristics, a forwarding device determines that the flow has ended, and if the forwarding device receives any additional packets with these characteristics, the forwarding device regards the packets as belonging to a new data stream.

Once a new data stream is received and identified, the forwarding device determines whether the new data stream is critical to the user at step 404. In embodiments the forwarding device's policing module 216 in FIG. 2 determines whether the data stream is critical, using the user created policy stored in a policy table 214.

When the data stream is critical, method 400 at step 408 assigns a dedicated channel from bundle channel 304 to the data stream. For example method 400 may assign first dedicated channel 304a to a first critical data stream of user 102. In some embodiments, regulator module 112 assign the dedicated channel to the data stream, based on the configuring signal it receives from policing module 210.

When the data stream is not critical, method 400 at step 406 may assign common channel 302 to the data stream. In embodiments, regulating module 212 assigns the common channel to the data stream.

Figure 5:
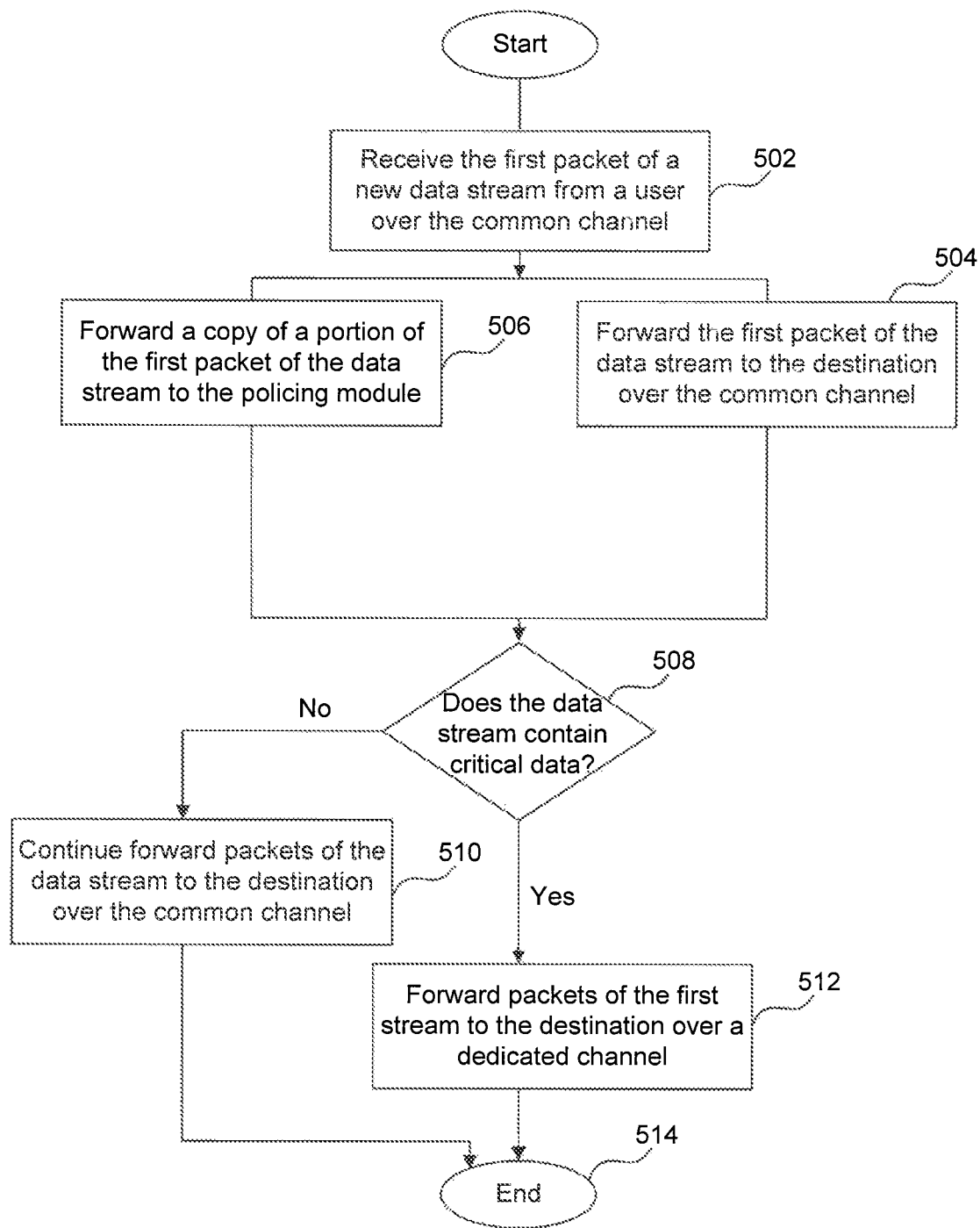
FIG. 5 is a flowchart that illustrates a method for determining whether a data stream is critical and assigning a channel to the data stream.

FIG. 5 is a flowchart that illustrates a method 500 for determining whether a data stream is critical and determining a channel for the data stream. Method 500 is described with respect to the example embodiments in FIGS. 1A-13, 2, and 3.

Referring to FIG. 5, method 500 begins by receiving the first packet of a new data stream over common channel 302 from user 102 to forwarding device 104. In some embodiments, forwarding module 210 in the forwarding device 104 receives the first packet.

Method 500, at step 504, forwards the first packet of the data stream to the destination over common channel 302. In embodiments, forwarding module 210, after receiving the first packet of a new data stream, will forward the first packet to the destination over common channel 302 that belongs to user 102.

At step 506 a copy of at least a portion of the data stream's first packet is forwarded to a policy device, such as policy device 106 in FIG. 2, and specifically policing device 106's policing module 216. The portion of the packet may be a portion that includes information about the packet, for example the header of the packet. In one example the first X number of bits of the packet may be forwarded onto the policing module.

At step 508, the policing module determines whether the first stream contains critical data, in embodiments, the policing module uses the information in the copy of the portion of the packet to identify the data stream. The policing module uses the user policy for the data stream stored in its policy table, to determine whether the data stream is critical according to the policy of the user.

To complete step 508, policing module may use the source or destination address of the packet to identify the corresponding policy that user 102 has created for the data stream. For example, if the user is created a policy where all data streams destined to an address are critical, then if the header information of the first packet indicates that the data stream is destined to the specified destination and the stream is identified as critical.

When the data stream is determined to be critical at step 512, packets of the data stream are forwarded over a dedicated channel to the destination. To forward the packets, policing module 216 may send a signal to regulating module 212 in forwarding device 104, instructing regulating module 212 to assign a dedicated channel to the stream in accordance with the specified policy of user 102.

When the data stream is determined not contain critical information, at step 510, subsequent packets of the data stream continue to be forwarded over common channel 302 to the destination. For example, if the user defines critical data streams based on destination address, when policy module 216 determines that the destination address of the first packet in the data stream does not have any of the destinations user 102 has defined as critical, policy module 216 determines the data stream is not critical. Subsequently, policy module 216 may send a signal to regulating module 212 of forwarding device 104 to send the remaining packets of the data stream over common channel 302 to the destination. Common channel 302 may be shared among the user's non-critical data.

Allocating Capacity Among the Critical Data Streams

As discussed with reference to FIG. 5, when a data stream is determined to contain critical data, a dedicated channel is assigned to it. When capacity is available in the dedicated channel, subsequent packets of a critical data stream are transmitted over the dedicated channel. Embodiments describe methods of transmitting packets of the critical data stream when capacity is unavailable over the dedicated channel.

Figure 6:
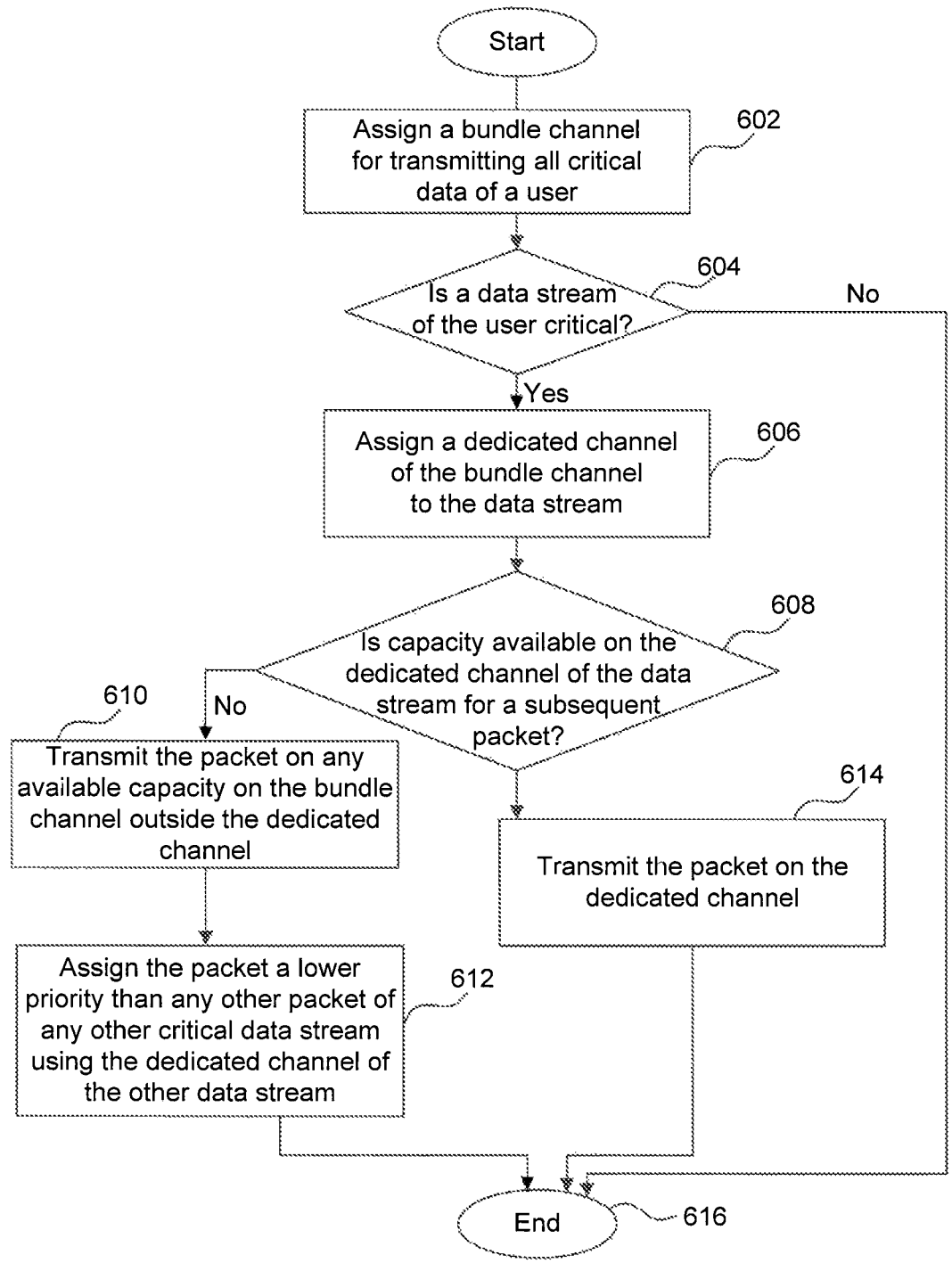
FIG. 6 is a flowchart that illustrates a method for assigning dedicated channels to critical data streams.

FIG. 6 is a flowchart that illustrates a method 600 for assigning packets to dedicated channels. Again, method 600 is described with respect to the example embodiments in FIGS. 1A-B, 2, and 3.

Referring to FIG. 6, method 600 starts at step 602 to assign bundle channel 304 for transmitting all critical data streams of user 102. In embodiments, policing module 216 reviews the user's policy to determine the capacity of the bundle channel to be assigned to all critical data streams of user 102. Policing Module 216 may send a signal for configuring regulator module 212 to assign bundle channel 304 to all critical data streams of user 102.

Method 600 determines at step 604 whether a data stream of user 102 is critical. Embodiments described above with respect to FIG. 5 may be used in determining whether the data stream is critical. When method 600 determines that the data stream is not critical, method 600 ends in step 616.

When the policing module determines that the data stream is critical, it sends a signal to the regulating module in the forwarding device, instructing regulating module to assign a dedicated channel within the bundle channel 304 to the data stream at step 606.

At step 608, the regulating module 212 determines whether there is capacity available in the dedicated channel to a data stream for transmitting a subsequent packet of the data stream. For example if first dedicated channel 304a is assigned to the data stream, at step 608 the regulating module 212 determines whether there is free capacity available on channel 304b for forwarding a subsequent packet. In embodiments, regulator module 212 determines whether there is free capacity available for packets of a data stream using a dedicated channel. When free capacity is available on the dedicated channel, regulator module 212 sends the subsequent packet on the dedicated channel. In embodiments, regulator module 212 regulates sending subsequent packets of a critical data stream on the dedicated channel assigned to the data stream, when there is available capacity.

When regulator module 212 determines needed capacity is unavailable on a dedicated channel for subsequent packets of the data stream, method 600 transmits the packet on any free capacity in the bundle channel. For example, when there is no free capacity on a dedicated channel assigned to a critical data stream, any subsequent packet of the critical data stream will be transmitted using any available bandwidth, time slot, or code word within the bundle channel. In embodiments, regulator module 212 determines availability of free capacity for transmitting a packet on a dedicated channel and transmitting the packet on the bundle channel when no free capacity is available on the dedicated channel assigned to the data stream.

At step 612, method 600 assigns the packet a lower priority than any other packet of any other critical data stream using the dedicated channel of the other data stream. In embodiments, regulator module 112 assigns the lower priority to the packet.

Figure 7:
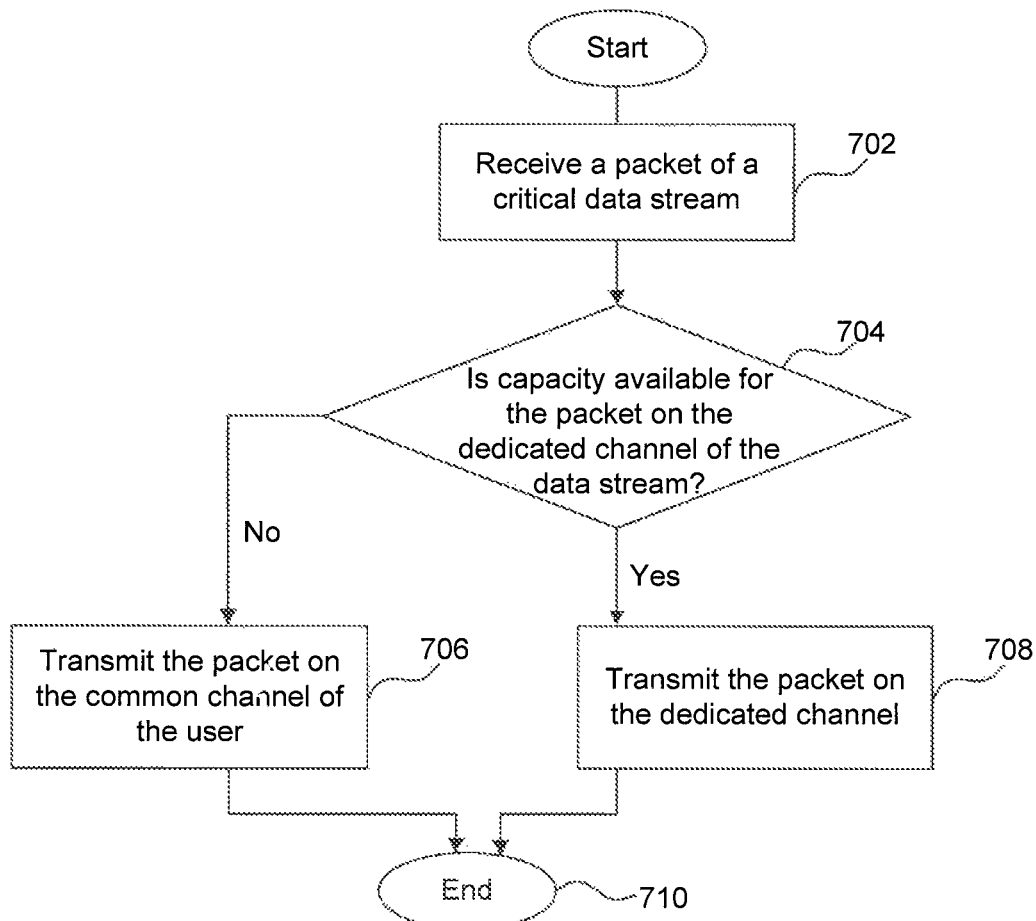
FIG. 7 is a flowchart that illustrates a method for assigning dedicated channels to critical data streams.

FIG. 7 is a flowchart that illustrates a method 700 for assigning packets to dedicated channels. Method 700 is described with respect to the example embodiments in FIGS. 1A-B, 2, and 3.

Referring to FIG. 7, method 700 starts at step 702 by receiving a packet of a critical data stream. At step 704, method 700 determines whether there is free capacity available for the packet to be transmitted on the channel dedicated to the data stream.

When capacity is available for the packet, method 700 at step 708 forwards the packet on the dedicated channel. When no free capacity is available, method 700 at step 706 forwards the packet on common channel 302 assigned to the user 102. In the embodiment shown in FIG. 2, regulating module 212 determines whether there is free capacity available for the packet on the dedicated channel. Regulating module 212 may instruct the forwarding module 210 to forward the packet on the dedicated channel when there is bandwidth available on the dedicated channel. When no free capacity is available on the dedicated channel for the packet, regulator module 212 may instruct the forwarding module 210 to forward the packet on the common channel 304 of user 102. In embodiment, all the traffic forwarded on common channel 304 share the capacity of the common channel.

Figure 8:
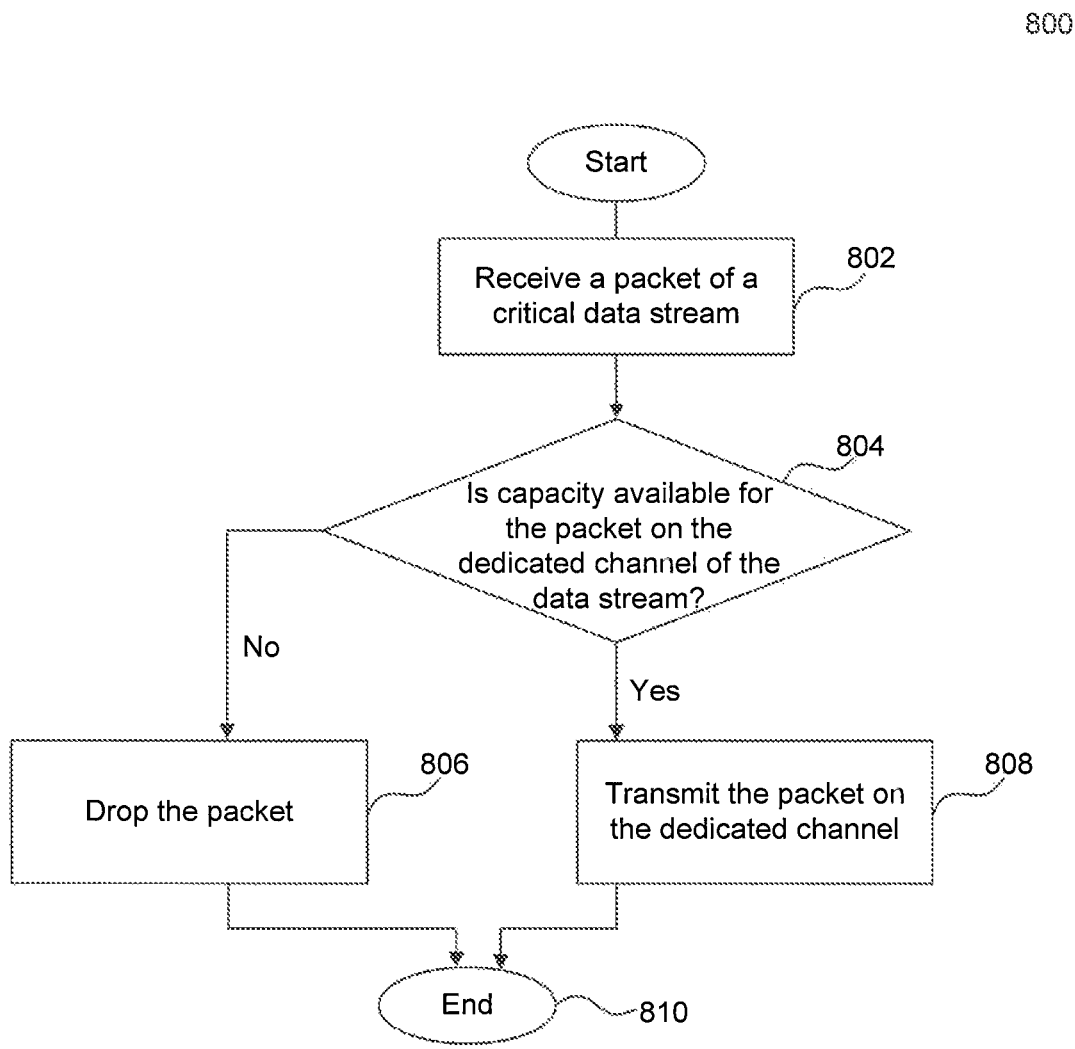
FIG. 8 is a flowchart that illustrates a method for assigning dedicated channels to critical data streams.

FIG. 8 is a flowchart that illustrates a method 800 for assigning packets to dedicated channels. Method 800 is described with respect to the example embodiments in FIGS. 1A-B, 2, and 3.

Referring to FIG. 8, method 800 starts at step 802 by receiving a packet of a critical data stream. At step 804, method 800 determines Whether there is free capacity available for the packet to be transmitted on the channel dedicated to the data stream.

When capacity is available for the packet, method 800 at step 806 forwards the packet on the dedicated channel. When capacity is insufficient for the packet, method 800 at step 806 drops the packet. In embodiments, regulating module 212 determines whether there is free capacity available for the packet on the dedicated channel. Regulating module 212 may further instruct the forwarding module 210 to forward the packet on the dedicated channel when there is bandwidth available on the dedicated channel. When no free capacity is available on the dedicated channel for the packet, regulator module 112 may instruct forwarding module 110 to drop the packet.

Terminating Dedicated Channel Assignment

Figure 9:
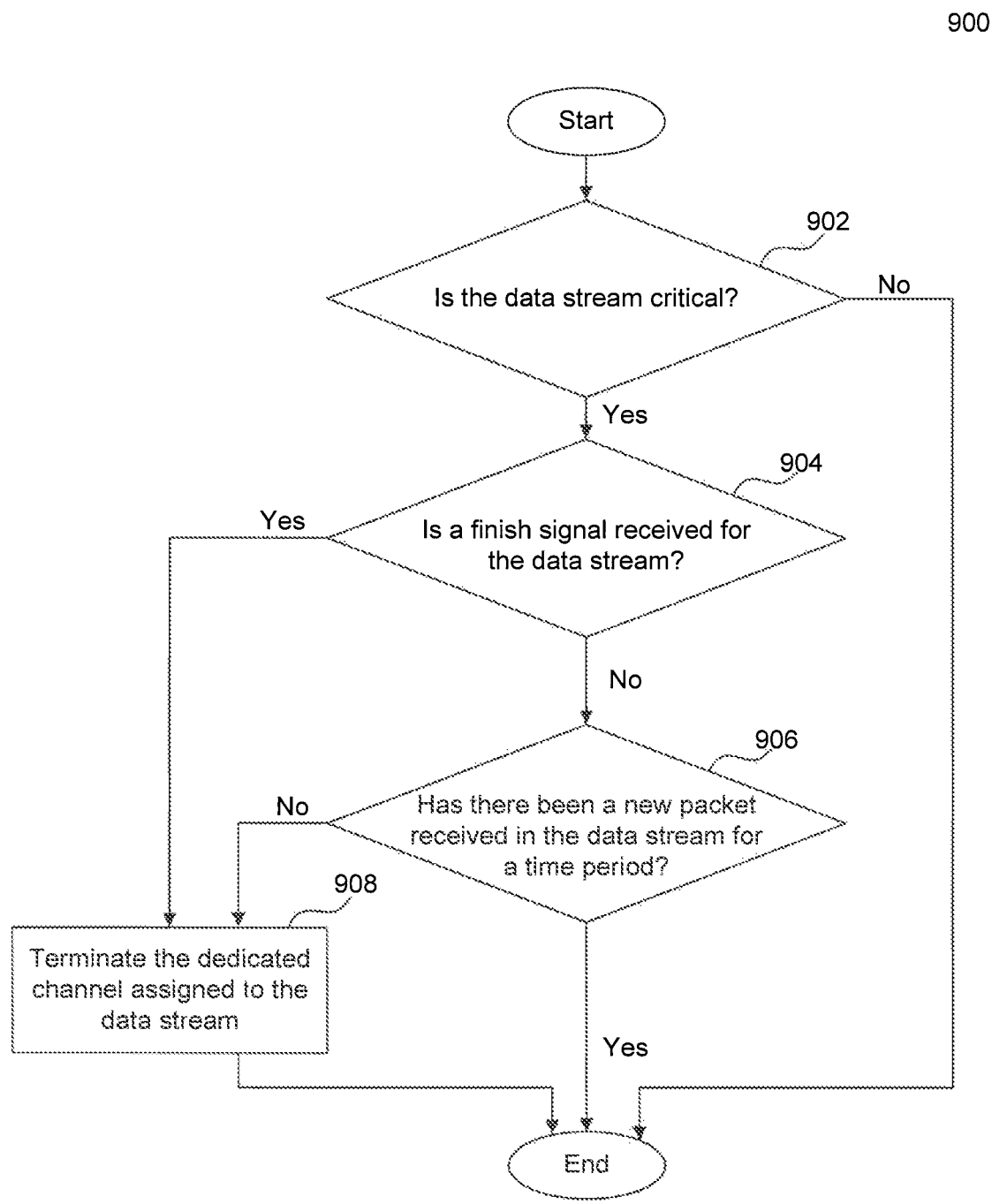
FIG. 9 is a flowchart that illustrates a method for terminate a dedicated channel.

FIG. 9 is a flowchart that illustrates a method 900 for terminating dedicated channel assignments. Method 900 is described with respect to the example embodiments is FIGS. 1A-B, 2, and 3.

Referring to FIG. 9, method 900 starts at step 902 by determining whether a data stream is critical. Same approach as discussed above with respect to FIG. 4 can be used for such determination. At step 904, method 900 determines whether a "finish" signal indicating the end of the data stream is received. In embodiments, regulator module 212 determines whether a "finish" signal is received. At step 906 method 900 determines whether there has been a new packet received in the data stream for a given time period. In embodiments, regulator module 212 makes such determination.

When a "finish" signal has been received for the data stream or there has not been a new packet received in the data stream for a given time period, at step 908, method 900 terminates the dedicated channel assignment to the data stream. In embodiments, regulating module 212 instructs forwarding module 104 to such this termination.

Another Example Embodiment

In an example embodiment a network content provider may generate critical traffic for transmitting over the network to its users. For example a video content provider may generate video traffic for its viewers and consider its traffic as critical. The content provider, in this example, can create a policy that dedicated channels be assigned to all of traffic streams it generates. In this way, the content provider is enabled provide a service, for example video streaming service to its clients, such that its data traffic will not share the same channels as the rest of the traffic over the network.

CONCLUSION

The term "user," as used herein, may encompass both a customer of the network connectivity service, such as an employee of a business that utilizes the network connectivity service, and a network administrator of the service provider itself. Users may also be at different companies or organizations.

Policy table 214 may be any stored type of structured memory, including a persistent memory. In examples, each database may be implemented as a relational database or file system.

Each of the servers and modules in FIG. 2 may be implemented in hardware, software, firmware, or any combination thereof.

Each of the servers and modules in FIG. 2 may be implemented on the same or different computing devices. Such computing devices can include, but are not limited to, a personal computer, a mobile device such as a mobile phone, workstation, embedded system, game console, television, set-top box, or any other computing device. Further, a computing device can include, but is not limited to, a device having a processor and memory, including a non-transitory memory, for executing and storing instructions. The memory may tangibly embody the data and program instructions. Software may include one or more applications and an operating system. Hardware can include, but is not limited to, a processor, a memory, and a graphical user interface display. The computing device may also have multiple processors and multiple shared or separate memory components. For example, the computing device may be a part of or the entirety of a clustered or distributed computing environment or server farm.

Identifiers, such as "(a)," "(b)," "(i)," "(ii)," etc., are sometimes used for different elements or steps. These identifiers are used for clarity and do not necessarily designate an order for the elements or steps.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A computer-implemented method for transmitting data from a source to a destination through a plurality of interconnected forwarding devices, comprising:
   (a) receiving, at a forwarding device, on a common channel from the source to the forwarding device, a first packet in a first data stream, wherein the common channel has a common capacity;
   (b) forwarding, on the common channel, the first packet from the forwarding device to the destination;
   (c) forwarding, to a policing device, a copy of a portion of the first packet, wherein the portion includes information about the first packet;
   (d) determining, by the policing device, whether the first data stream is a critical data stream based on the information about the first packet, wherein the policing device uses a policy defined by a user generating the first data stream to perform the determining in (d);
   (e) when the first data stream is determined to be critical in (d), configuring the forwarding device to forward a second packet of the first data stream on a first channel from the forwarding device to the destination;
   (f) determining whether capacity is available on the first channel for forwarding a third packet of the first data stream;
   (g) when the first data stream is determined to be critical in (d) and capacity is determined to be available in (f), configuring the forwarding device to forward, on the first channel, the third packet of the first stream from the forwarding device to the destination.

2. The method of claim 1, further comprising:
   (h) when the first data stream is determined to be critical in (d) and free capacity determined to be unavailable in (f), configuring the forwarding device to forward on the common channel the third packet of the first stream from the forwarding device to the destination.

3. The method of claim 1 wherein configuring in (e) further comprises when the first data stream is determined to be critical in (d) and capacity is determined to be unavailable in (f), configuring the forwarding device to drop the third packet.

4. The method of claim 1, wherein the policy comprises using a source or a destination address of the first packet.

5. The method of claim 1, further comprising:
   (h) receiving, at the forwarding device on the common channel from the source to the forwarding device, a first packet in a second data stream;
   (i) forwarding, on the common channel, the first packet from the forwarding device to the destination;
   (j) forwarding, to the policing device, a copy of a portion of the first packet of the second data stream, wherein the portion includes information about the first packet of the second data stream;
   (k) determining, by the policing device, based on the information in the portion of the first packet of the second data stream, whether the second data stream is another critical data stream; and
   (l) when the second data stream is determined to be critical in (k), configuring the forwarding device to forward on a second channel, a second packet of the second data stream from the forwarding device to the destination, wherein the second channel has a second capacity and is dedicated to the second data stream, and is different from the common channel.

6. The method of claim 5, further comprising assigning a bundle channel to all critical data streams belonging to the user, wherein the bundle channel has a bundle capacity that, when the first data stream is determined critical in (d), the bundle capacity comprises the first capacity of the first channel and, when the second data stream is determined critical in (k), the bundle capacity comprises the second bandwidth of the second channel.

7. The method of claim 6, wherein configuring in (e) further comprises, when the first data stream is determined to be critical in (d) and when no free capacity is available in the first channel for transmitting a third packet of the first data stream:
   (m) configuring the forwarding device to transmit the third packet of the first data stream on free capacity in the bundle channel; and
   (n) when the second data stream is determined critical in (k) and the free capacity in (m) overlaps with the second capacity, assigning a lower priority to the third packet of the first data stream than a packet of the second data stream.

8. The method of claim 1, further comprising, when the forwarding device receives a finish message indicating end of the first stream, terminating the configuration of the forwarding device in (e) to forward any other packet of the first stream on the first channel.

9. The method of claim 1, further comprising:
   when the forwarding device does not receive any packet belonging to the first stream for a period of time, terminating the configuration of the forwarding device in (e) to forward any other packet of the first stream on the first channel.

10. The method of claim 1, further comprising determining a price quote for a user generating the first data stream based on the first capacity and an amount of time the first channel is used by the user.

11. A system for transmitting data from a source to a destination through a plurality of interconnected forwarding devices, comprising:
   at least one processor;
   memory, operatively connected to the at least one processor and storing instructions that, when executed by the at least one processor, cause the system to perform a method, the method comprising:
   (a) receiving, at a forwarding device, on a common channel from the source to the forwarding device, a first packet in a first data stream, wherein the common channel has a common capacity;
   (b) forwarding, on the common channel, the first packet from the forwarding device to the destination;
   (c) forwarding, to a policing device, a copy of a portion of the first packet, wherein the portion includes information about the first packet;
   (d) determining, by the policing device, whether the first data stream is a critical data stream based on the information about the first packet, wherein the policing device uses a policy defined by a user generating the first data stream to perform the determining in (d);
   (e) when the first data stream is determined to be critical in (d), configuring the forwarding device to forward a second packet of the first data stream on a first channel from the forwarding device to the destination;
   (f) determining whether capacity is available on the first channel for forwarding a third packet of the first data stream;
   (g) when the first data stream is determined to be critical in (d) and capacity is determined to be available in (f), configuring the forwarding device to forward, on the first channel, the third packet of the first stream from the forwarding device to the destination.

12. The system of claim 11, wherein the method further comprises:
   (h) when the first data stream is determined to be critical in (d) and free capacity determined to be unavailable in (f), configuring the forwarding device to forward on the common channel the third packet of the first stream from the forwarding device to the destination.

13. The system of claim 11 wherein configuring in (e) further comprises when the first data stream is determined to be critical in (d) and capacity is determined to be unavailable in (f), configuring the forwarding device to drop the third packet.

14. The system of claim 11, wherein the policy comprises using a source or a destination address of the first packet.

15. The system of claim 11, wherein the method further comprises:
   (h) receiving, at the forwarding device on the common channel from the source to the forwarding device, a first packet in a second data stream;
   (i) forwarding, on the common channel, the first packet from the forwarding device to the destination;
   (j) forwarding, to the policing device, a copy of a portion of the first packet of the second data stream, wherein the portion includes information about the first packet of the second data stream;
   (k) determining, by the policing device, based on the information in the portion of the first packet of the second data stream, whether the second data stream is another critical data stream; and
   (l) when the second data stream is determined to be critical in (k), configuring the forwarding device to forward on a second channel, a second packet of the second data stream from the forwarding device to the destination, wherein the second channel has a second capacity and is dedicated to the second data stream, and is different from the common channel.

16. The system of claim 15, wherein the method further comprises assigning a bundle channel to all critical data streams belonging to the user, wherein the bundle channel has a bundle capacity that, when the first data stream is determined critical in (d), the bundle capacity comprises the first capacity of the first channel and, when the second data stream is determined critical in (k), the bundle capacity comprises the second bandwidth of the second channel.

17. The system of claim 16, wherein configuring in (e) further comprises, when the first data stream is determined to be critical in (d) and when no free capacity is available in the first channel for transmitting a third packet of the first data stream:

(m) configuring the forwarding device to transmit the third packet of the first data stream on free capacity in the bundle channel; and (n) when the second data stream is determined critical in (k) and the free capacity in (m) overlaps with the second capacity, assigning a lower priority to the third packet of the first data stream than a packet of the second data stream.

18. The system of claim 11, wherein the method further comprises, when the forwarding device receives a finish message indicating end of the first stream, terminating the configuration of the forwarding device in (e) to forward any other packet of the first stream on the first channel.

19. The system of claim 11, wherein the method further comprises:

when the forwarding device does not receive any packet belonging to the first stream for a period of time, terminating the configuration of the forwarding device in (e) to forward any other packet of the first stream on the first channel.

20. The system of claim 11, wherein the method further comprises determining a price quote for a user generating the first data stream based on the first capacity and an amount of time the first channel is used by the user.

* * * * *